United States Patent [19]

Hall

[11] Patent Number: 4,936,505

[45] Date of Patent: Jun. 26, 1990

[54] GAS-FIRED COAXIAL WATER/AIR VEHICLE HEATER

[76] Inventor: Donald O. Hall, 2801 Lencott Dr., Louisville, Ky. 40216

[21] Appl. No.: 291,104

[22] Filed: Dec. 28, 1988

Related U.S. Application Data

[63] Continuation-in-part of Ser. No. 8,757, Jan. 30, 1987, Pat. No. 4,794,908.

[51] Int. Cl.$^5$ ............................................. F24H 3/06
[52] U.S. Cl. .................................. 237/17; 237/12.36; 126/101; 126/99 D; 122/20 B
[58] Field of Search ...................... 237/12.3 C, 12.3 B, 237/16, 17; 126/107, 110 R, 110 B, 116 R, 110 A, 117, 104 A, 110 AA, 99 A, 99 D; 122/20 B

[56] References Cited

U.S. PATENT DOCUMENTS 4,424,934  1/1984  Wilhoite ................................ 237/16
4,706,644  11/1987  Nakai .................................. 126/101

Primary Examiner—Henry A. Bennet
Assistant Examiner—John Sollecito
Attorney, Agent, or Firm—Jon C. Winger

[57] ABSTRACT

An improved gas-fired heater for supplying heat to a space, such as a vehicle cab, and simultaneously, heat to the engine block for running the vehicle. A heat exchanger simultaneously heats a coolant which supplies heat to the engine block, and air to the vehicle cab. The gas-fired heater comprises an inner duct having opposite front and rear ends with a device at its front end for mixing and igniting a mixture of pressurized fuel and a combustion supporting gas that is discharged through an exhaust conduit from its rear end to an exhaust outlet located adjacent to its front end; an intermediate duct circumscribing the rear portion of the inner duct wherein the space between the inner and intermediate ducts receives a fluid to be heated; an outer duct surround the inner and intermediate duct and the exhaust conduit having opposite forward and rearward ends, respectively, located adjacent to the front and rear ends of the inner duct, and the outer duct having a fluid inlet opening proximate one of the opposite front and rear ends of the inner duct and a fluid outlet opening between the opposite front and rear ends of the inner duct; and a device for supplying a stream of pressurized fluid to the inlet opening of the outer duct for discharge through the outlet opening of the outer duct after having passed over the exteriors of and received heat from the inner and intermediate ducts.

15 Claims, 3 Drawing Sheets

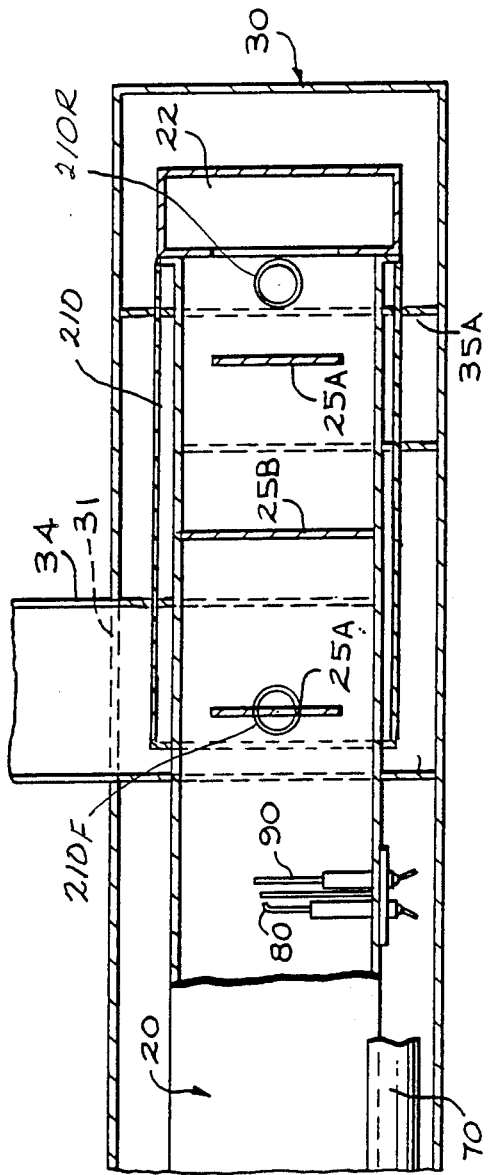
FIG. 3
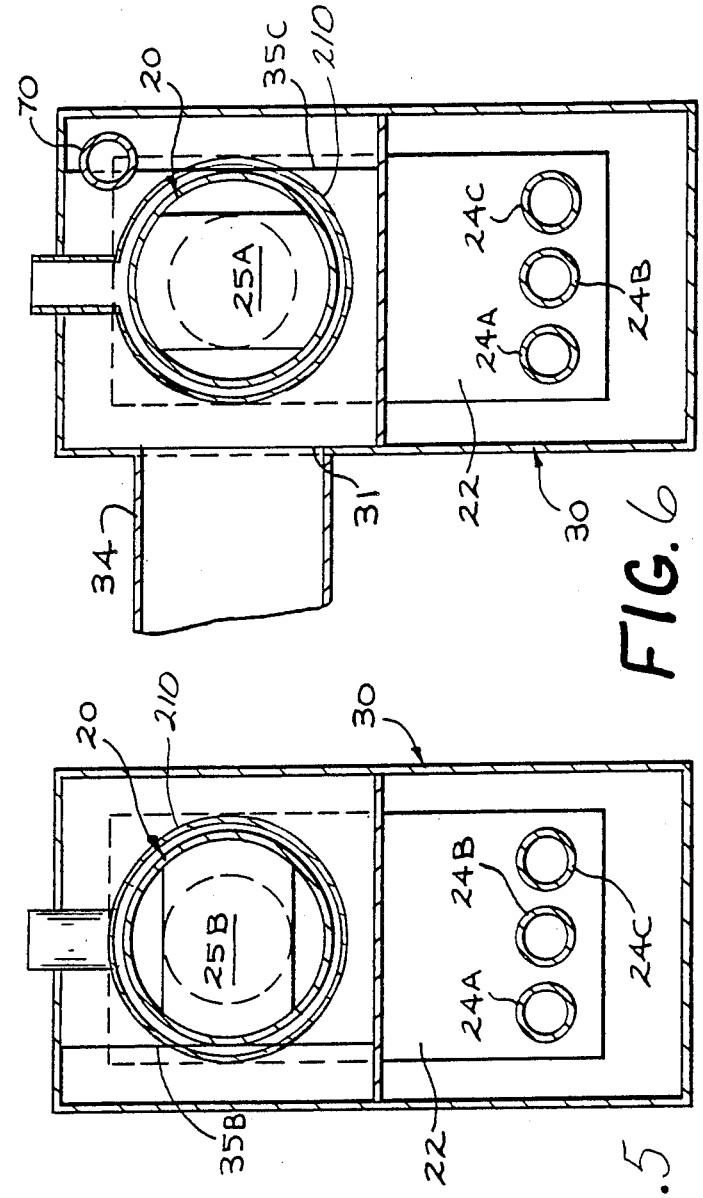
FIG. 4
FIG. 5
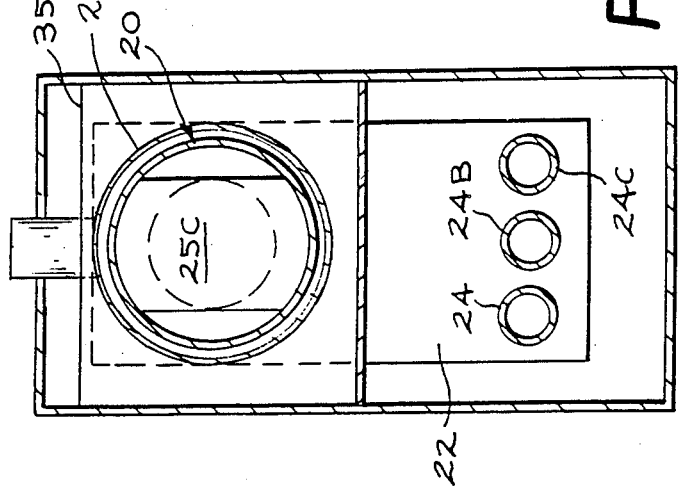
FIG. 6

GAS-FIRED COAXIAL WATER/AIR VEHICLE HEATER

BACKGROUND OF THE INVENTION

The present application is a continuation in part of my co-pending application, Ser. No. 008,757, filed Jan. 30, 1987, now U.S. Pat. No. 4,794,908.

This invention relates to means for supplying heat to a space, such as a motor vehicle cab and simultaneously therewith to the engine means for running the motor vehicle. More particularly, the present invention relates to improved gas-fired heater means for supplying such heat.

In the wintertime, in areas where the temperature gets extremely cold, over-the-road truck drivers are faced with difficulty in starting the engines in their over-the-road vehicles. In many instances and particularly for diesel engines when the temperature gets to 20° F. and lower, the viscosity of diesel fuels increases to the point they are difficult to pump and are therefore not easily ignited. In the prevention of problems with diesel engines, the trucks or tractors are either left running so the engine block stays heated or the vehicles are left in a garage or other environment where the vehicle is kept relatively warm.

In order to alleviate the problem of hard to start engines, particularly diesel-type engines, because of these relatively cold temperatures, I have found that a modification of the invention of my co-pending application provides a heating means to keep an engine block warm and simultaneously provide heat to the truck or tractor cab.

More specifically, the present invention provides an improved version of the gas-fired heater means shown and described in my earlier U.S. Pat. application Ser. No. 06/448,932, filed Dec. 13, 1982, now abandoned, which, in turn, were an improvement over the gas-fired heater means shown and described in U.S. Pat. No. 3,670,713, issued to R. W. Abbott on Feb. 8, 1972, and the liquid fuel heater means shown and described in U.S. Pat. No. 3,029,802, issued Apr. 17, 1962 to J. L. Breese.

SUMMARY OF THE INVENTION

It has now been found that an engine block, particularly for a motor vehicle, can be kept warm by pumping the coolant through a specific heat exchanger and simultaneously therewith the air to the cab of the motor vehicle can also be heated. Furthermore, the engine and the cab may both be heated by remote control so the driver does not have to enter the vehicle until it is warm and the engine is ready to fire.

Basically, the improved gas-fired heater means of the present invention comprises: an inner duct-like member having opposite front and rear ends and provided adjacent its front end with means for receiving, mixing and igniting a mixture of pressurized fuel gas and a combustion supporting gas within its interior that is discharged through exhaust conduit means from its rear end to an exhaust outlet located adjacent to its front end; an intermediate duct-like member having an inlet and an outlet circumscribing and spaced from the inner duct-like member, the rear end of the intermediate duct-like member being adjacent the rear end of the inner duct-like member; the front end of the intermediate duct-like member being spaced rearwardly a preselected distance from the front end of the inner duct-like member; an outer duct-like member surrounding the inner and intermediate duct-like member and the exhaust conduit means and having opposite forward and rearward ends, with the forward and rearward ends of the outer duct-like member being respectively located adjacent to the front and rear ends of the inner duct-like member and the outer duct-like member having a fluid inlet opening located proximate to one of the opposite front and rear ends of the inner duct-like member and a fluid outlet opening located between the opposite front and rear ends of the inner duct-like member; means for supplying a stream of a pressurized first fluid to the inlet opening of the outer duct-like member for discharge through the outlet opening of the outer duct-like member after having passed over the exteriors of and received heat from the inner and intermediate duct-like members and the exhaust conduit means to supply heated first fluid to a space via second conduit means interconnectable between that space and the outlet opening of the outer duct-like member; and, means for supplying a stream of a pressurized second fluid to the inlet opening of the intermediate duct-like member, and, In a preferred embodiment utilizing the improved gas-fired heater means, the first fluid is the ventilating air for a vehicle cab and the second fluid is a coolant for an engine block. A first temperature sensing means is disposed in temperature sensing relation with its first pump means for the first fluid and second pump means for the second fluid. A second temperature sensing means is in temperature sensing relation with the second fluid and the heat exchanger whereby when the temperature in the vehicle cab is below the preselected temperature for the first temperature sensing means, the first and second pump means are activated, and when the temperature of the coolant is below the preselected temperature for the second temperature sensing means, the heat source is activated.

Assuming that the fluid to be heated and the combustion supporting gas are identical, e.g. both are air, the improved heater means of the present invention can be provided with combustion supporting gas intake means adjacent to the fluid outlet opening of the second duct-like member that are fluid connected to the first duct-like member for diverting a stream of the pressurized fluid into the front end of the first duct-like member for mixing and ignition therein with the fuel gas. And, while most certainly not limited thereto, propane has produced good results when employed as the fuel gas.

It is further desirable that thermally responsive control means be mounted adjacent to the aforenoted combustion supporting gas intake means for controlling the flow therethrough of the combustion supporting gas in inverse proportion to the temperature of the combustion supporting gas.

BRIEF DESCRIPTION OF THE DRAWINGS

The present invention is illustrated in the accompanying drawings, wherein:

FIG. 3 is a view taken along line 3—3 of FIG. 2;

FIG. 4 is a view taken along line 4—4 of FIG. 2;

FIG. 5 is a view taken along line 5—5 of FIG. 2;

FIG. 6 is a view taken along line 6—6 of FIG. 2.

DETAILED DESCRIPTION

Figure 1:
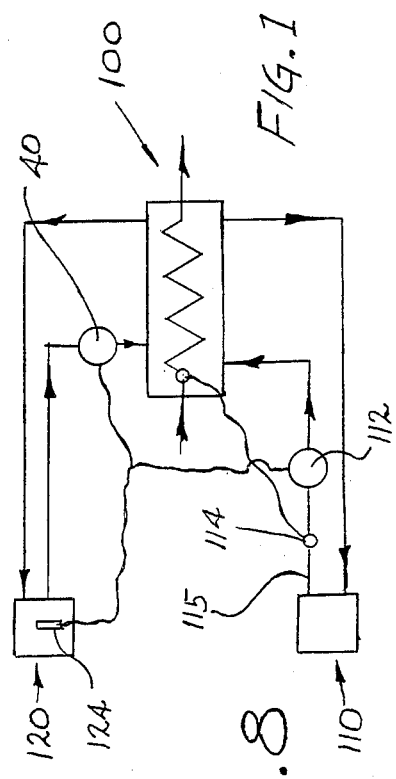
FIG. 1 is a schematic view of one embodiment of the present invention.
Figure 7A:
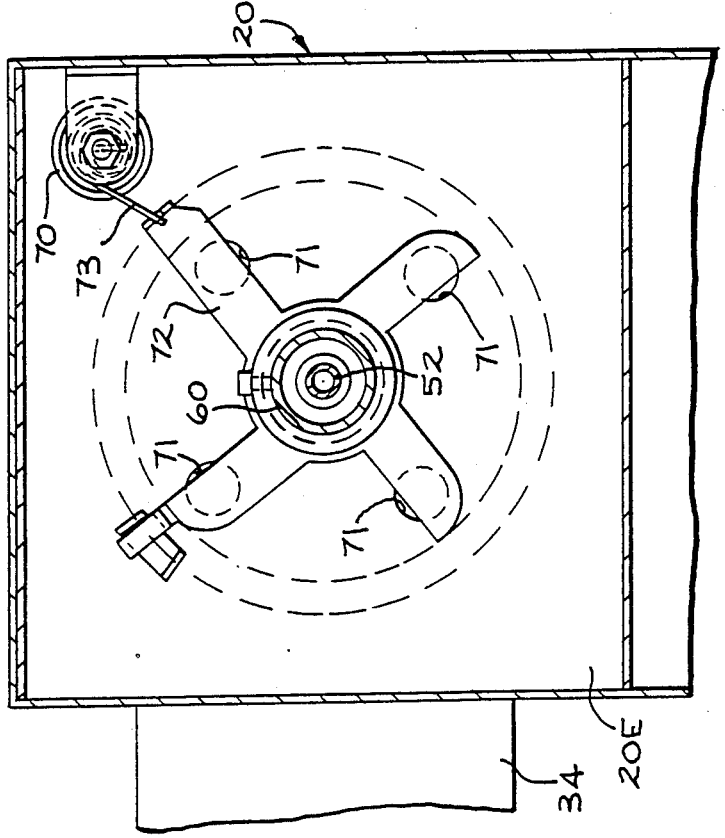
FIG. 7A is a view similar to FIG. 7 but showing the thermally responsive gas flow control means illustrated therein in a different operating condition.
Figure 7:
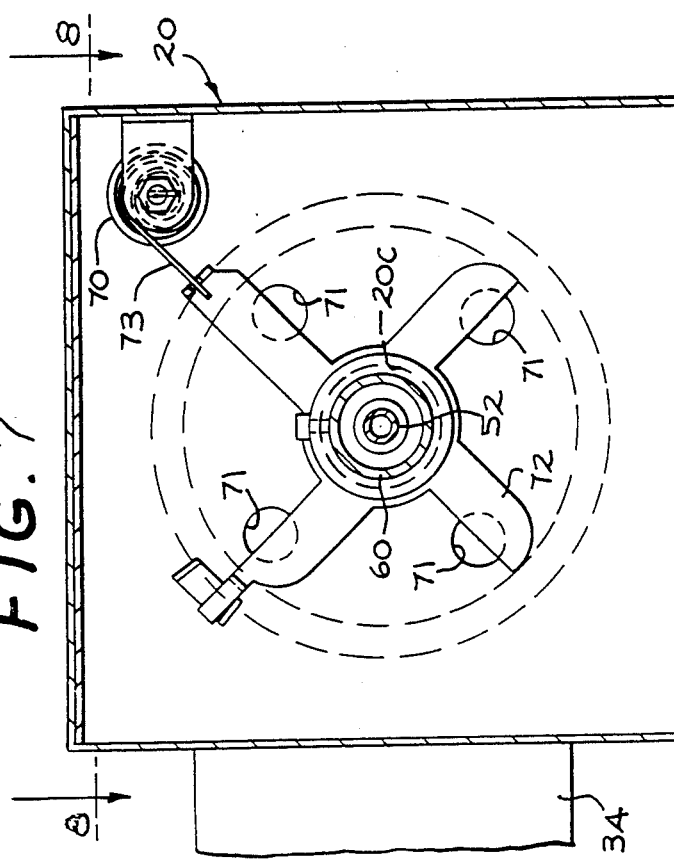
FIG. 7 is a view taken along line 7—7 of FIG. 2.
Figure 8:
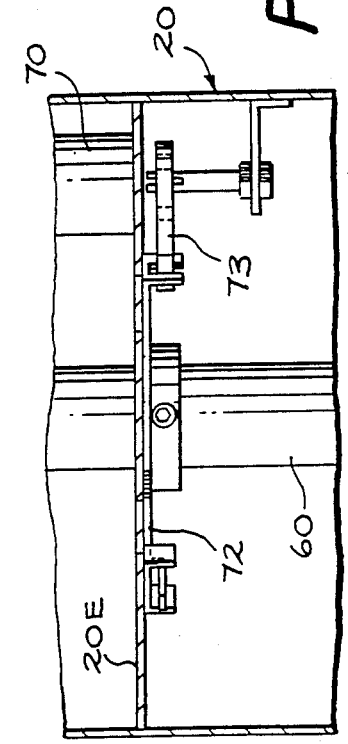
FIG. 8 is a view taken along line 8—8 of FIG. 7.

FIG. 1 shows one embodiment of the present invention in a schematic view. In the figure, a heat exchanger 100 is utilized to heat the coolant from an engine block 110 and simultaneously air for a cab 120 for a truck or tractor (not shown). A pump 112 is used to pump the coolant from the block 110 through the heat exchanger 100 and back to the block 110 and a blower 40 is used to circulate air from the cab 120 through the heat exchanger 100, back to the cab 120. A temperature sensing device 124 is provided to sense the temperature of the air in the cab 120 and activate or de-activate pump 112 and blower 40 in response to the sensed temperature condition. The temperature sensing device 124 is operatively connected to a thermostat (not shown) so that at a preselected temperature condition, the pump 112 and the blower 40 are either activated or de-activated.

A second temperature sensing device 114 is disposed in the fluid line 115 upstream of the pump 112. The temperature sensing device 114 is in electrical communication with the ignition means for the blower for the heat exchanger 100. At a preselected coolant temperature, the temperature sensing device 114 either activates or deactivates the burner for the heat exchanger 100. The structure and operation of the heat exchanger 100 will be discussed in detail hereinafter.

In operation, the thermostat in or for cab 120 is set at a preselected temperature. If the temperature in cab 120 is below the set temperature, temperature sensing device 124 activates coolant pump 112 and air blower 40. The circulating air from the cab flows into heat transfer relative with the coolant in the heat exchanger 100, picking up heat from the coolant if the coolant is at a higher temperature than the air and giving up heat if the coolant is cooler than the air. The temperature sensing device 114 is set at a preselected operating temperature, usually about 135° F. so that if the pumping coolant is below that temperature the burner in the heat exchanger 100 is ignited and the coolant is brought up to 135° F. When the coolant reaches 135° F., the burner is turned off and the heat transfer in the heat exchanger continues until the air in the cab 120 reaches the preselected temperature set by the thermostat. When this occurs, the pump 112 and blower 40 are de-activated.

In the operation of the heating system shown in FIG. 1, particular for a vehicle cab and engine block, a switch for the thermostat or a remote control unit (not shown) which are well known in the art are generally used to activate the thermostat, and in turn temperature sensing device 124. This arrangement is particularly useful to heat up the cab 120 and engine block 110 on cold mornings before the driver enters the cab 120 and starts the engine.

Turning now to FIGS. 2–8, there is shown, somewhat schematically, a presently preferred form of the improved gas-fired heater means 10 that are provided in accordance with the present invention for supplying heat to a space, such as a room, house, building, vehicle or the like or a cab 120 as shown in FIG. 1, and simultaneously supplying heat to a second space such as an engine block 110, as shown in FIG. 1.

As illustrated, the heater means 10 basically comprises a first, or inner, duct-like member 20, a second, or outer, duct-like member 30, and a third or intermediate duct-like member 210.

The first, or inner, duct-like member 20 has opposite front 20F and rear 20R ends and a long central axis extending therebetween and is provided adjacent to its front end 20F with means, which will be hereinafter described in detail, for receiving, mixing and igniting a mixture of pressurized fuel gas and a combustion supporting gas within its interior that is discharged through exhaust conduit means from its rear end 20R to an exhaust outlet or vent 21 located adjacent to its front end 20F to the atmosphere. As best illustrated in drawing FIGS. 2 and 4–6, the exhaust conduit means preferably include a first collector section 22 that is fluid-connected to the rear end 20R of the first duct-like member 20, a second collector member 23 that is fluid connected to the exhaust vent 21 and a manifold of heat-transferring tubes 24A, 24B and 24C that are fluid connected between the two collector sections 22 and 23.

The intermediate duct-like member 210 has opposite front 210F and rear 210R ends and a long central axis extending therebetween. The intermediate member 210 circumscribes generally the rear-most section of the first duct-like member 20 and extends to the front end 210F a preselected distance, usually about one-half the distance from end 20F to end 20R. Intermediate member 210 is provided with an inlet 212 and an outlet 214 for receiving a fluid, such as a coolant for an engine block, therethrough.

The outer duct-like member 30 surrounds the inner duct-like member 20, the intermediate duct-like member 210, as well as the collector portions 22 and 23 and intervening manifold of tubes 24A, 24B of the exhaust conduit means therefor. Outer duct-like member 30 has opposite forward 30F and rearward 30R ends, with the forward 30F and rearward 30R ends of the outer duct-like member 30 being respectively located adjacent to the front 20F and rear 20R ends of the inner duct-like member 20 and the outer duct-like member 30 having a fluid outlet opening 31 located between the opposite front 20F and rear 20R ends of the inner duct-like member 20. The outer duct-like member 30 has a fluid inlet opening 32 proximate to one of the opposite front 20F or rear 20R ends (the front end 20F, as illustrated) of the inner, duct-like member 20.

Figure 2:
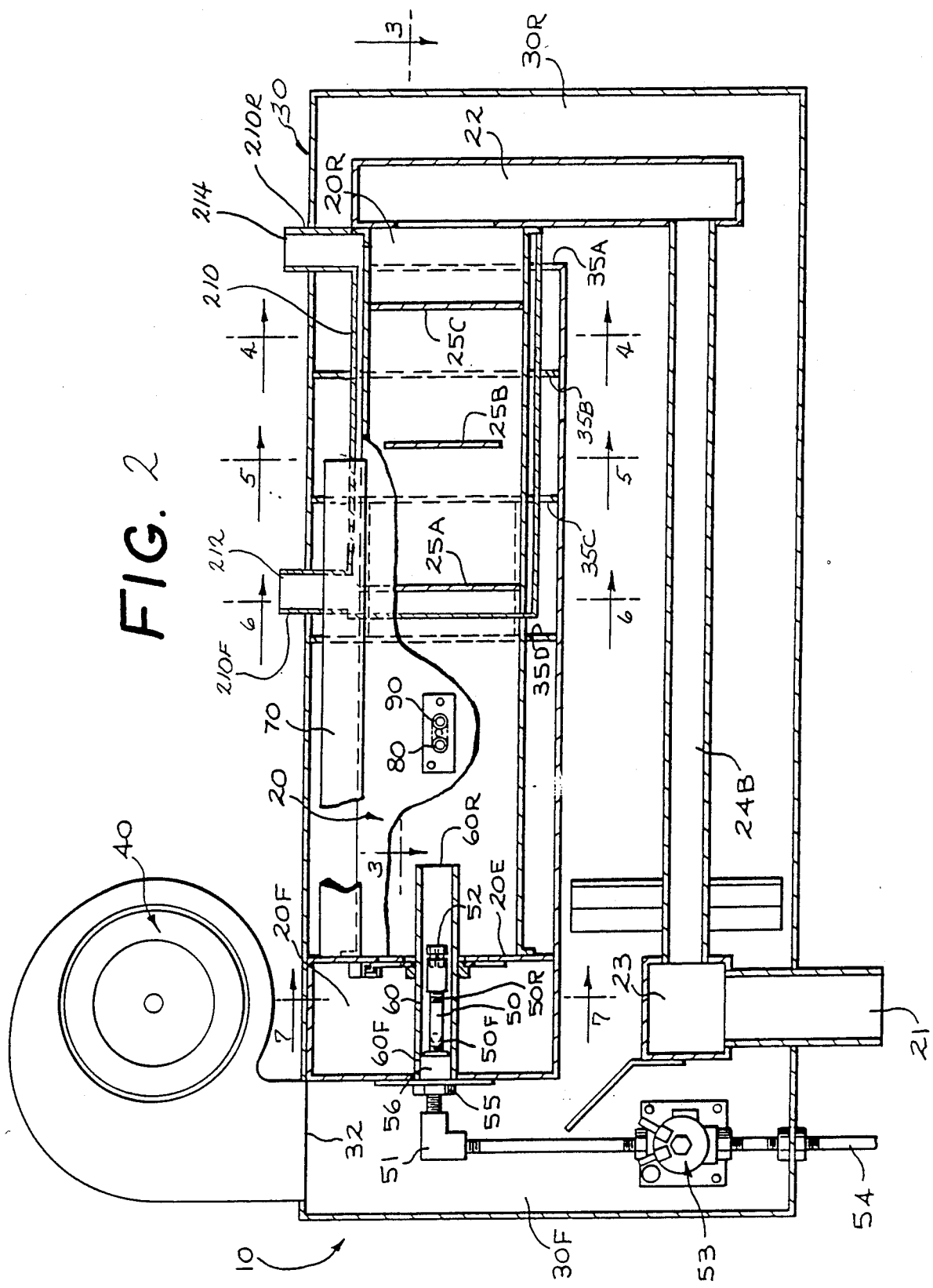
FIG. 2 is a somewhat schematic, partly-sectioned and broken, side elevational view illustrating one presently preferred form of the improved gas-fired heater means provided in accordance with the present invention.

In addition, means, such as the blower 40 illustrated in FIG. 2 of the drawing, are provided for supplying a stream of pressurized fluid such as air to the inlet opening 32 of the outer duct-like member 30 for discharge through the outlet opening 31 of the outer duct-like member 30 after having passed over the exteriors of and received heat from the inner duct-like member 20 and the exhaust conduit means 23, 24A, B, C and 22 to supply heated fluid to a space (not shown) to be heated via a hollow conduit means 34 that is interconnectable between such a space and the outlet opening 31 of the outer duct-like member 30.

As further shown in drawing FIGS. 2, 3, 7, 7A and 8, the aforenoted means for receiving, mixing and igniting a pressurized mixture of fuel gas and a combustion supporting gas within the interior of the inner duct-like member 20 include gas fuel-receiving 50 pipe that has opposite front 50F and rear 50R ends and a long central axis extending therebetween that is also generally coaxially aligned with the aforenoted long central axis of the first duct-like member 20.

The front end 50F of this gas-receiving pipe extends toward the front end wall of the inner duct-like member 20 and can be connected, in a well known manner, by means including an elbowed pipe fitting 51 shown in drawing FIG. 2, to a source of pressurized gas fuel (not shown) such as a tank of propane through a pressure regulator 53 and other piping 54 upstream thereof which extends through the wall of the outer duct-like member 30.

And, the rear end of the fuel gas-receiving pipe 50 extends toward the front end 20F of the inner duct-like member 20 and is provided with a nozzle 52 through which the pressurized fuel gas can be discharged into the interior of the inner duct-like member 20 via a second pipe 60 that surrounds and is generally co-axially aligned with the fuel gas-receiving pipe 50.

As further illustrated, this second pipe 60 has opposite front 60F and rear 60R ends and a long central axis that extends therebetween and is generally co-axially arranged with the aforenoted other two long axes. Its front end 60F passes through the front end wall of the inner duct-like member 20 and is fastened thereto by a nut 55 that is threaded over the front end of another pipe fitting 56 that is located within the second pipe 60 and fluid connected between the elbowed pipe fitting 51 and the front end 50F of the fuel gas-receiving pipe 50. The rear end 60R of this second pipe extends through a circular opening 20C that is centrally located in an intermediate wall 20E of the inner duct-like member 20 and directs discharge of the fuel gas from the nozzle 52 into the interior of said inner duct-like member 20.

In the illustrated embodiment of the improved gas-fired heater means 10 of the present invention, the presurized combustion supporting gas that is mixed and ignited with the pressurized fuel gas and the fluid to be heated are identical; they are both air. And, fluid communication means are provided between the inner and outer duct-like members 20 and 30 in the form of combustion supporting gas intake means 70 that are located adjacent to the outlet opening 31 from the outer duct-like member 30 such that a portion of the pressurized air stream that is supplied by the blower means 40 to the fluid inlet opening 32 of the outer duct-like-like member 30 is used for mixing with the pressurized fluid gas that is supplied via the fuel gas-receiving pipe 50.

As best shown in drawing FIGS. 2, 4, 7, 7A and 8, these fluid communication means also include plural apertures 71 which extend through the aforenoted intermediate wall 20E of the inner duct-like member 20.

As still further illustrated in drawing FIGS. 2 and 3, igniter means 80 and flame detector means 90 of a well-known type are provided for the heater means 10 of the present invention for respectively igniting and detecting the flame resulting from ignition of the pressurized mixture of fuel gas and combustion supporting gas and are located within the interior of the inner duct-like member 20 between the rear end 60R of the second pipe 60 and the exhaust vent means 22 for the products of combustion of said mixture that is located at the rear end 20R of the inner duct-like member 20.

As additionally shown in drawing FIGS. 2–6, baffle means, comprising a plurality of axially-spaced apart baffle plates 25A, 25B and 25C are desirably situated within the interior of the inner duct-like member 20 between the igniter 80 and flame detector 90 means and the rear end 20R of inner duct-like member 20 to alternatively deflect the flow of the ignited mixture of the pressurized fuel gas and combustion supporting gas towards the top, bottom and sides of inner duct-like member 20 and, thus, promote transfer of heat therefrom to the stream of fluid that is to be heated by its passage over the exterior thereof enroute to the fluid outlet opening 31 of the outer duct-like member 30 for subsequent delivery to the space to be heated via the hollow conduit means 34 that is interconnectable to said outlet opening 31. And, additional baffle plates 35A, 35B, 35C and 35D are provided within the interior of the outer duct-like member 30 for alternatively deflecting the flow of the pressurized fluid that is to be heated into contact with all sides of the rear end 20R of the inner duct-like member 20 and to guide the passage of said fluid to the fluid outlet opening 31 of the outer duct-like member 30 for subsequent delivery to the space to be heated via the hollow conduit means 34 that is interconnectable to said outlet opening 31.

Finally, as best shown in drawing FIGS. 2, 7, 7A and 8, thermally responsive control means are provided for controlling the flow of combustion supporting gas through the combustion supporting gas intake means in inverse proportion to the temperature of the combustion supporting gas. As illustrated, these thermally responsive control means include a swastika-shaped valve member 72 that has its center pivotally mounted around the exterior of the second pipe 60 immediately axially rearward of the aforenoted intermediate wall 20E of the inner duct-like member 20, with the distal ends of its four arms respectively at least partially covering one of the plural apertures 71 that extend through said intermediate wall 20E. And, as further shown, the swastika-shaped valve member 72 is movable by a thermally-responsive coil 73 that is mounted adjacent to the combustion supporting gas intake means 70 between a first operating position (FIG. 7), wherein the temperature of the combustion supporting gas is low and restriction of the apertures 71 by the valve member 72 is slight and the flow of said combustion-supporting gas therethrough high, and a second operating position (FIG. 7A), wherein the temperature of the combustion supporting gas is higher and the restriction of the apertures 71 by the valve member 72 is greater and the flow of said combustion-supporting gas therethrough is reduced.

While various materials and methods may be employed for constructing the improved gas-fired heater means 10 of the present invention, particularly good results have been obtained by forming the inner duct-like member 20 of 310 stainless steel.

It should be apparent that while there has been described what is presently considered to be a presently preferred form of the present invention in accordance with the Patent Statutes, changes may be made in the disclosed device without departing from the true spirit and scope of this invention. It is, therefore, intended that the appended claims shall cover such modifications and applications that may not depart from the true spirit and scope of the present invention.

What is claimed is:

1. Improved gas-fired space heater means, comprising in combination:
   (a) an inner duct-like member having opposite front and rear ends, said inner member having a longitudinally extending interior wall with a plurality of axially spaced baffles extending inwardly therefrom, said inner member being provided adjacent said front end with means for receiving, mixing and igniting a mixture of pressurized fuel gas and a combustion supporting gas within said interior that is discharged through exhaust conduit means from said rear end to an exhaust outlet located adjacent to said front end;

(b) an intermediate duct-like member having opposed front and rear ends, said intermediate duct-like member circumscribing and spaced from said inner duct-like member, said rear end of said intermediate duct-like member being adjacent said rear end of said inner duct-like member, said front end of said intermediate duct-like member being spaced rearwardly a preselected distance from said front end of said inner duct-like member, said intermediate duct-like member having an inlet at one end and an outlet at an opposed end;

(c) an outer duct-like member, surrounding said inner duct-like member, said intermediate duct-like member, and said exhaust conduit means and having opposite forward and rearward ends, with said forward and rearward ends of said outer duct-like member being respectively located adjacent to said front and rear ends of said inner duct-like member;

(d) said outer duct-like member having a fluid inlet opening located proximate to one of said opposite front and rear ends of said first duct-like member and a fluid outlet opening located between said opposite front and rear ends of said first duct-like member;

(e) means for supplying a stream of a pressurized first fluid to said inlet opening of said intermediate duct-like member; and, (f) means for supplying a stream of a pressurized second fluid to said inlet opening of said outer duct-like member for discharge through said outlet opening of said outer duct-like member after having passed over the exteriors of and received heat from said inner duct-like member, said intermediate duct-like member, and said exhaust conduit means to supply heated second fluid to a space via second conduit means interconnectable between that space and said outlet opening of said outlet duct-like member.

2. The invention of claim 1, wherein:
(a) said second fluid and second combustion supporting gas are identical, and
(b) combustion supporting gas intake means are provided adjacent to said fluid outlet opening of said outer duct-like member and are fluid connected to said inner duct-like member for diverting a portion of said stream of pressurized second fluid into said front end of said inner duct-like member for mixing and ignition therein with said fuel gas.

3. The invention of claim 2, further including thermally-responsive control means mounted adjacent to said combustion supporting gas intake means for controlling the flow therethrough of said combustion supporting gas in inverse proportion to the temperature of said combustion supporting gas.

4. The invention of claim 1, wherein said first fluid is a liquid.

5. The invention of claim 4, wherein said liquid is a coolant for an engine block.

6. The invention of claim 1, wherein said second fluid is air.

7. The invention of claim 1, wherein said fuel gas is propane.

8. An improved heating means for simultaneously heating two environments from the same heat source comprising:
a first space to be heated;
a second space to be heated;
a heat source;
first fluid communicating means disposed between and in heat exchange relationship with said first space to be heated and said heat source for circulating the first fluid between said first space to be heated and said heat source, said first fluid communicating means including first fluid pump means therein;
second fluid communicating means disposed between and in heat exchange relationship with said second space to be heated and said heat source for circulating the second fluid between said second space to be heated and said heat source, said second fluid communicating means including second fluid pump means therein;
first temperature sensing means set at a preselected temperature disposed in temperature sensing relationship with the first fluid in said first space to be heated, and first temperature sensing means being in electrical communication with said first fluid pump means and said second fluid pump means for activating said first fluid pump means and second fluid pump means when the temperature of the first fluid is below the preselected temperature setting of said first temperature sensing means; and,
second temperature sensing means set at a preselected temperature in temperature sensing relation with said second fluid upstream of said heat source and in electrical communication with said heat source for activating said heat source when the temperature of the second fluid upstream of said heat source is below the preselected temperature setting of said second temperature sensing means.

9. The improved heating means of claim 8, wherein said first space is a cab.

10. The improved heating means of claim 8, wherein said second space is an engine block.

11. The improved heating means of claim 8, wherein said first fluid is air.

12. The improved heating means of claim 8, wherein said second fluid is a liquid coolant.

13. The improved heating means of claim 8, wherein said heat source comprises:

(a) an inner duct-like member having opposite front and rear ends, said inner member having a longitudinally extending interior wall with a plurality of axially spaced baffles extending inwardly therefrom, said inner member being provided adjacent said front end with means for receiving, mixing and igniting a mixture of pressurized fuel gas and a combustion supporting gas within said interior that is discharged through exhaust conduit means from said rear end to an exhaust outlet located adjacent to said front end;

(b) an intermediate duct-like member having opposed front and rear ends, said intermediate duct-like member circumscribing and spaced from said inner duct-like member, said rear end said intermediate duct-like member being of adjacent said rear end of said inner duct-like member, said front end of said intermediate duct-like member being spaced rearwardly a preselected distance from said front end of said inner duct-like member, said intermediate duct-like member having an inlet at one end and an outlet at an opposed end;

(c) an outer duct-like member surrounding said inner duct-like member, said intermediate duct-like member, and said exhaust conduit means and having opposite forward and rearward ends, with said forward and rearward ends of said outer duct-like member being respectively located adjacent to said front and rear ends of said inner duct-like member;

(d) said outer duct-like member having a fluid inlet opening located proximate to one of said opposite front and rear ends of said first duct-like member and a fluid outlet opening located between said opposite front and rear ends of said first duct-like member;

(e) means for supplying a stream of a pressurized first fluid to said inlet opening of said intermediate duct-like member; and, (f) means for supplying a stream of a pressurized second fluid to said inlet opening of said outer duct-like member for discharge through said outlet opening of said outer duct-like member after having passed over the exteriors of and received heat from said inner duct-like member, said intermediate duct-like member, and said exhaust conduit means to supply heated second fluid to a space via second conduit means interconnectable between that space and said outlet opening of said outlet duct-like member.

14. The improved heating means of claim 8, including a thermostat in electrical communication with the first temperature sensing means.

15. The improved heating means of claim 14, including remote switch means for said thermostat.

* * * * *